US005319841A

United States Patent [19]

Yata et al.

[11] Patent Number: 5,319,841

[45] Date of Patent: Jun. 14, 1994

[54] METHOD FOR FILLING A CONTAINER WITH COMPRESSED POLYURETHANE FOAM

[75] Inventors: Tatsuo Yata; Shu Inoue, both of Yokohama, Japan

[73] Assignee: Bridgestone Corporation, Tokyo, Japan

[21] Appl. No.: 903,154

[22] Filed: Jun. 24, 1992

[30] Foreign Application Priority Data

Jun. 24, 1991 [JP] Japan .................................. 3-56310

[51] Int. Cl.[5] .............................................. B23P 11/02

[52] U.S. Cl. ......................................... 29/451; 29/450

[58] Field of Search ............... 280/830, 834; 220/88.1, 220/562; 29/450, 451

[56] References Cited

U.S. PATENT DOCUMENTS

| | | | |
|---|---|---|---|
| 3,703,330 | 1/1973 | Harr . | |
| 3,782,588 | 1/1974 | Allen | 220/88.1 |
| 3,867,492 | 2/1975 | Drostholm | 29/451 |
| 4,570,323 | 2/1986 | Legerius et al. | 29/451 |
| 4,764,408 | 8/1988 | Stedman et al. | 220/88.1 |
| 4,771,295 | 9/1988 | Baker et al. . | |
| 4,929,969 | 5/1990 | Morris . | |
| 4,987,670 | 1/1991 | Papania | 29/451 |
| 5,207,247 | 5/1993 | Hood | 29/451 |

FOREIGN PATENT DOCUMENTS

| | | |
|---|---|---|
| 0261764 | 3/1988 | European Pat. Off. . |
| 0419192 | 3/1991 | European Pat. Off. . |
| 0488829 | 6/1992 | European Pat. Off. . |

OTHER PUBLICATIONS

Brian G. Morris, "Novel Material Used as an Ink Reservoir for Drop-On-Demand Printers", *In Proceedings: The Sixth International Congress on Advance in Non-Impact Printing Technologies,* Oct. 21-26, 1990, pp. 498-507.

*Primary Examiner*—Mark Rosenbaum
*Assistant Examiner*—David P. Bryant
*Attorney, Agent, or Firm*—Sughrue, Mion, Zinn, Macpeak & Seas

[57] ABSTRACT

Disclosed herein is a polyurethane foam-filled container of the type wherein the cavity is filled with polyurethane foam of open-cell structure, characterized in that the foam is filled in compressed state and the compression is effected in the direction of the minor axis of the unit cell constituting the foam. The container is suitable as fuel tanks and ink and paint reservoirs. Also disclosed herein is a method for filling polyurethane foam into a container.

7 Claims, 4 Drawing Sheets

METHOD FOR FILLING A CONTAINER WITH COMPRESSED POLYURETHANE FOAM

BACKGROUND OF THE INVENTION

1. Field of the Invention

The present invention relates to a container filled with polyurethane foam in a compressed state to store and supply a liquid such as fuel, paint, and ink, said container having a cavity capable of uniformly storing, holding, and discharging a liquid.

The present invention also relates to a method for filling a liquid container with polyurethane foam in uniformly compressed state.

2. Description of the Prior Art

Conventional containers holding fuel or any liquid pose a problem when they are in motion during use. The problem is associated with the movement of the liquid to one end of the cavity, which changes the center of gravity of the liquid and causes sloshing. They also have a disadvantage that the discharging rate of liquid (e.g., fuel) varies depending on the amount of liquid in the cavity. To address this problem, there has been proposed a means to prevent the movement of liquid in the cavity by filling the cavity with polyurethane foam of open-cell structure. (See U.S. Pat. No. 4,771,295.)

According to the disclosed prior art technology, the cavity of a container is filled with polyurethane foam of open-cell structure, so that liquid is stored in the cells of the foam. This arrangement prevents the liquid from greatly moving in the cavity even when the container is in motion, and also permits the liquid to be discharged uniformly irrespective of the amount of liquid in the container.

However, the prior art technology still suffers from a disadvantage resulting from the fact that the cavity of a container is merely filled with as much polyurethane foam as the volume of the cavity. In other words, the foam cells in the cavity do not steadily hold the liquid but permit the liquid to move in the foam when the container is in motion. Moreover, the foam cells do not ensure the uniform discharging of the liquid.

SUMMARY OF THE INVENTION

It is an object of the present invention to provide a polyurethane foam-filled container which stores and holds liquid uniformly in its cavity and permits liquid to be discharged uniformly.

It is another object of the present invention to provide a method for uniformly filling a container with polyurethane foam.

The present invention is embodied in a polyurethane foam-filled container of the type wherein the cavity is filled with polyurethane foam of open-cell structure, characterized in that the foam is filled in the compressed state and the compression is effected in the direction of the minor axis of the unit cell constituting the foam.

The polyurethane foam used in the present invention is flexible polyurethane foam, which may vary in physical properties, cell size, and compression ratio depending on the kind of the liquid to be held in the container.

According to the present invention, the polyurethane foam should have a cell number of 20 to 100/inch, preferably 30 to 60/inch, a density of 0.010 to 0.070 g/cm$^3$, preferably 0.020 to 0.040 g/cm$^3$, a void volume of 93 to 99%, preferably 96 to 98%. The foam compression ratio should be 1/1 to 1/10, preferably ½ to 1/10, more preferably ½ to 1/5.

If the cell number is lower than 50/inch, the foam compression ratio should be ½ to 1/10. If the cell number is higher than 50/inch, the foam compression ratio should be 1/1 to 1/5, preferably ½ to 1/5.

The polyurethane foam specified above may have cell membrane unremoved. However, polyurethane foam of open cell structure with no cell membranes is preferable. The open-cell polyurethane foam (or reticulated polyurethane foam) with no cell membranes can be obtained by any known method, including the dipping of foam in an aqueous alkaline solution or the breaking of cell membranes by explosion.

According to the present invention, the polyurethane foam is filled into the cavity of the container in such a manner that the foam is compressed in the direction of the minor axis of the unit cell. This compression may be accomplished mechanically or thermally for permanent deformation.

The present invention is characterized in that the polyurethane foam filled into the cavity of the container is compressed in the direction of the minor axis of the unit cell. The compressed foam produces a stronger capillary action than the foam which is merely filled into the cavity without compression. The stronger capillary action reduces the movement of liquid in the cavity when the container is in motion and yet permits liquid to be discharged uniformly.

Since individual cells of polyurethane foam are oval rather than spherical as revealed by microscopic observation, the polyurethane foam will produce uneven capillary action if it is compressed in the direction of the major axis of oval. The uneven capillary action hinders the uniform discharging of liquid. Therefore, it is necessary to compress the polyurethane foam uniformly by performing compression in the direction of the minor axis of the unit cell.

The liquid container filled with polyurethane foam, which is compressed in the direction of the minor axis of the unit cell as mentioned above, offers the following advantages. Compression brings individual cells close together so that individual cells produce a stronger capillary action which helps the polyurethane foam to hold liquid stably even when the container is in motion. The compressed polyurethane foam prevents the rapid leakage of liquid when the container is broken. This contributes to safety.

The polyurethane foam-filled container of the present invention will find use as a fuel container (for gasoline), ink container (for office machines), and paint container. The compressed polyurethane foam in the container ensures storage and smooth discharge of liquid owing to the capillary action of the foam. It will also find use as other containers owing to its characteristic properties.

For the polyurethane foam-filled container to exhibit its effect as mentioned above, it is necessary to carry out compression in a specific manner. Simple compression will result in uneven compression that appears as streaks, and these streaks cause liquid to flow along them.

According to the present invention, the object is accomplished by a method which comprises a first step of compressing polyurethane foam in a certain amount along guides in the direction of the minor axis of the unit cell, and a second step of moving the compressed polyurethane foam in the direction vertically perpendicular to the direction of compression in the first step, thereby filling the compressed polyurethane foam into a container along guide pieces on the inner wall of the container.

The above-mentioned method should preferably be modified such that the first step is followed by an additional substep of slightly adjusting the amount of compression in the direction horizontally perpendicular to the direction of compression in the first step.

According to the present invention, the guide and guide piece should preferably be coated with a layer of a resin having a low coefficient of friction, and a preferred example of the resin is a fluoroplastic.

The above-mentioned method is intended to specify the direction of compression, thereby filling a container with a compressed polyurethane foam which is completely free from wrinkles. In other words, it specifies the direction and sequence of compression and pushing to facilitate the filling of the foam into a container. Thus the method of the present invention permits polyurethane foam to be uniformly filled into a container.

According to the method of the present invention, the filling of polyurethane foam into a container is accomplished by two steps which differ in the direction of compression and pushing. This method is effective in the uniform filling of polyurethane foam into a container. The resulting polyurethane foam-filled container may be used as a fuel container, in which case the fuel is relieved from vigorous sloshing and the fuel is discharged smoothly at a constant rate.

DETAILED DESCRIPTION OF THE PREFERRED EMBODIMENTS

Figure 1:
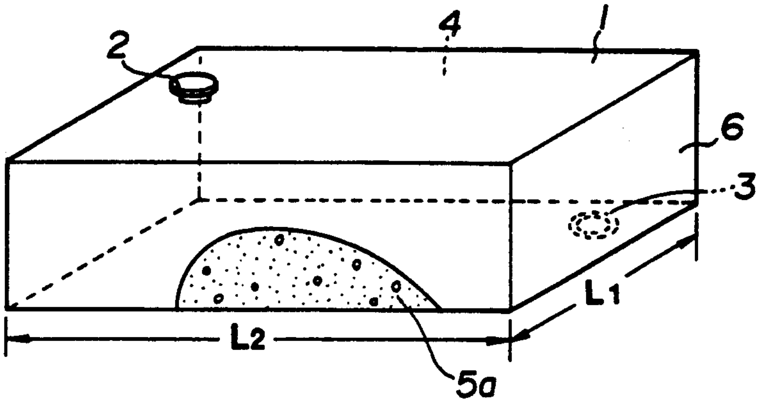
FIG. 1 is a partly cutaway perspective view showing a fuel container pertaining to the present invention.

FIG. 1 is a partly cutaway perspective view showing a fuel container as an example of the container pertaining to the present invention. Referring to FIG. 1, there are shown a container proper 1, an inlet 2 (for gasoline or the like), an outlet 3, and a cavity 4. The cavity 4 is filled with compressed polyurethane foam 5*a*.

Figure 2:
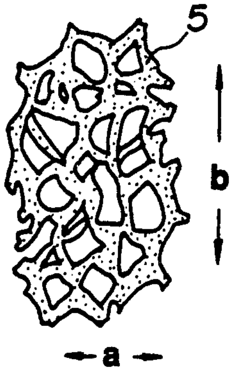
FIG. 2 is a fragmentary sectional view showing the reticulated polyurethane foam used in the present invention.
Figure 3:
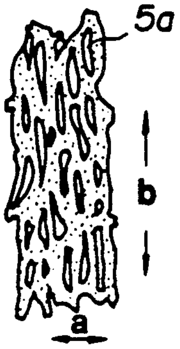
FIG. 3 is a fragmentary sectional view showing the polyurethane foam in compressed state used in the present invention.

FIG. 2 is an enlarged fragmentary sectional view showing the polyurethane foam used in the present invention, and FIG. 3 is an enlarged fragmentary sectional view showing the polyurethane foam in compressed state.

The polyurethane foam 5 is reticulated one, with its cell membranes removed by explosion method.

According to the present invention, the polyurethane foam 5 is compressed in the direction of the minor axis of the unit cell constituting the foam. The minor axis (indicated by "a") and major axis (indicated by "b") of the unit cell can be identified by observing the foam with a magnifier. In general, the direction of the major axis (b) coincides with the direction in which the polyurethane foam expands from the liquid raw material in the foaming process, and the direction of the minor axis (a) is perpendicular to the direction of the major axis (b). Compressing the foam in the specified direction is one of the features of the present invention.

The filling of compressed polyurethane foam into the cavity of the container is accomplished in the following manner.

A piece of polyurethane foam specified below is made ready for filling under compression into the fuel container 1. It has a cell number of 35 to 40/inch, a hardness of 17 to 23 kgf, and an apparent density of 0.034 g/cm$^3$. It is three times as long as the lateral length ($L_1$) of the container 1, and it is almost as wide as the longitudinal length ($L_2$) of the container. Needless to say, the direction of $L_1$ coincides with the direction of the minor axis (a). In other words, this polyurethane foam is to be compressed in its longitudinal direction.

It is important that the polyurethane foam be compressed uniformly when it is filled into the container. Uneven compression will give rise to locally collapsed cells and wrinkles along which the liquid in the container flows. In this state the feature of the present invention is not obtained. To accomplish uniform compression, the polyurethane foam is filled into the container along guides attached to the inside of the container. The guides (not shown) are made of fluoroplastic to ensure smooth filling. In this embodiment, the guides are in the form of flexible thin plate of fluoroplastic attached to the inside of the container.

When the polyurethane foam 5*a* has been uniformly filled into the container, the compressed polyurethane foam is in the state as shown in FIG. 3. That is, individual cells are thinned and compressed in the direction of the minor axis (a).

The polyurethane foam 5*a* is filled into the container through the side 6 (shown in FIG. 1), which is closed afterward.

In this embodiment, the polyurethane foam 5 is filled into the container while it is being compressed. In another embodiment, it is possible to fill the container with previously compressed polyurethane foam. In this case, compression may be accomplished by thermal compression. Thermal compression, however, has a disadvantage that compression takes place more in the outer part in contact with the press than in the core. This leads to uneven compression and the incompletely compressed part of the foam permits the liquid to pass more than the completely compressed part. This is detrimental to the uniform discharging. Therefore, it is necessary to choose a proper method for compression according to the properties of the liquid to be held in the container.

The compression of the polyurethane foam and the filling of the compressed polyurethane foam into the container are carried out in the following manner. (Compression is in the direction of the minor axis (a) of the unit cell constituting the polyurethane foam, as shown in FIG. 2.)

Figure 4:
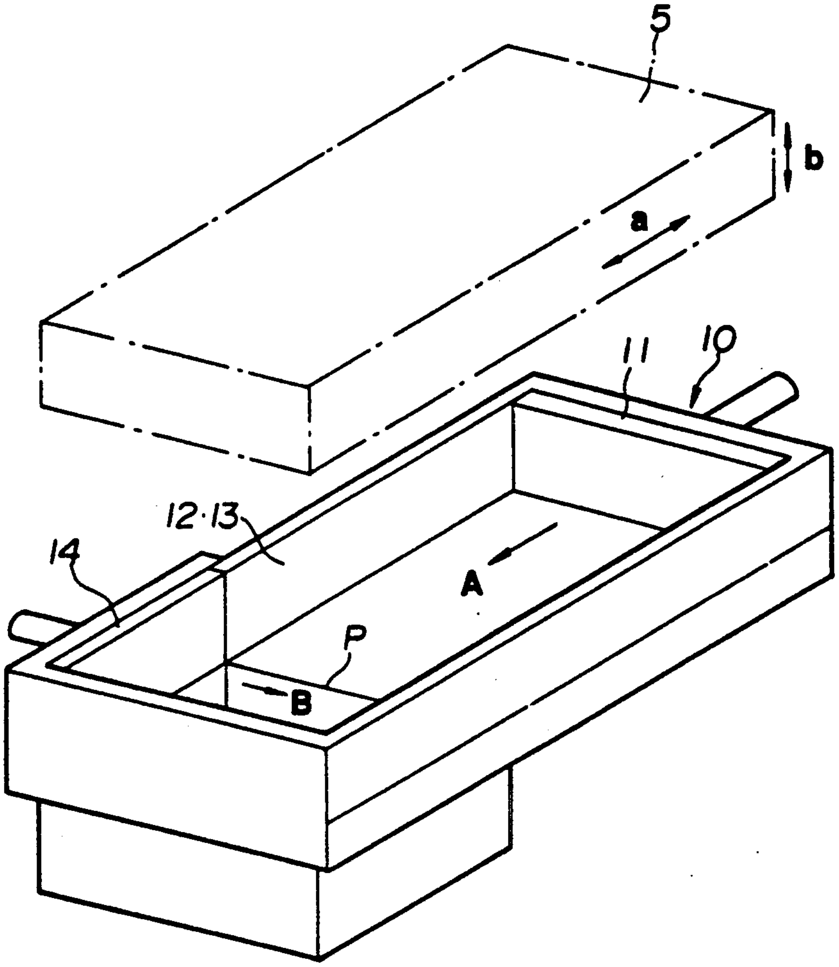
FIG. 4 is a perspective view showing the jig used for compressing polyurethane foam in the first embodiment of the present invention.

FIG. 4 is a perspective view showing a jig used for compressing and filling the polyurethane foam in one embodiment of the present invention. There is shown a frame 10 in which the polyurethane foam 5 is fitted.

This frame 10 is provided with three pushers. A first pusher 11 is arranged in the lengthwise direction of the frame 10. The polyurethane foam 5 is placed in the frame 10 such that the direction of the minor axis of the unit cell is perpendicular to the surface of the pusher 11 and the direction of the major axis of the unit cell is vertical.

With the polyurethane foam placed in the frame as mentioned above, the first step begins. That is, the first pusher 11 is moved in the direction A so that the polyurethane foam 5 is compressed in the direction of the minor axis (a) until the pusher 11 reaches the position P, as shown in FIG. 4. The compression ratio is about ⅓.

In the first step, it is important that the polyurethane foam be compressed uniformly. Locally concentrated compression will give rise to locally collapsed cells which form wrinkles. Such wrinkles cause the liquid in the container to flow along them. Thus uniform compression is essential in the present invention.

According to the present invention, the uniform compression is ensured by the guides 13 of fluoroplastic film attached to the inside 12 of the frames 10, as shown in FIG. 4.

In this embodiment, the first step of compressing the polyurethane foam 5a is followed by a substep of slightly adjusting the amount of compression in the direction B horizontally perpendicular to the direction of compression in the first step. This substep is accomplished by the aid of the second pusher 14.

In the second step, the compressed polyurethane foam is pressed by the third pusher 15 in the direction C vertically perpendicular to the direction of the compression in the first step. In the final step, the compressed polyurethane foam 5a is moved from the frame 10 into the container 20 placed under the frame 10. In this way, the polyurethane foam is filled into the container 20.

Figure 5:
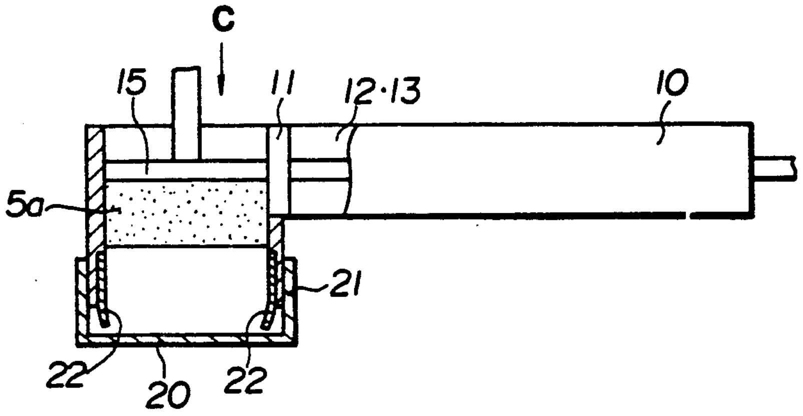
FIG. 5 is a side view showing how the final step of the first embodiment is carried out.

FIG. 5 is a side view showing how the final step shown in FIG. 4 is carried out. There are shown sliders of fluoroplastic film 22 suspending on the inside 21 of the container 20. They ensure smooth filling of the compressed polyurethane foam 5a into the container 20.

As mentioned above, the method of the present invention comprises a first step of compressing the polyurethane foam in the direction A in the frame 10 along the guide 13 of fluoroplastic film, an optional substep of slightly adjusting the amount of compression in the direction B (which is horizontally perpendicular to the direction of compression in the first step) so that the compressed polyurethane foam fits in the container, a second step of pressing the polyurethane foam in the direction which is vertically perpendicular to the direction of compression in the first step, and finally pushing the compressed polyurethane foam (in the direction C) into the container along the sliders 22 of fluoroplastic film. Thus the polyurethane foam is uniformly compressed and filled into the container.

The polyurethane foam filled into the container is compressed in the direction of the minor axis (a) of the unit cell as shown in FIG. 3. Being uniformly compressed without wrinkles, the polyurethane foam prevents the sloshing of liquid and produces the strong capillary action.

Figure 6:
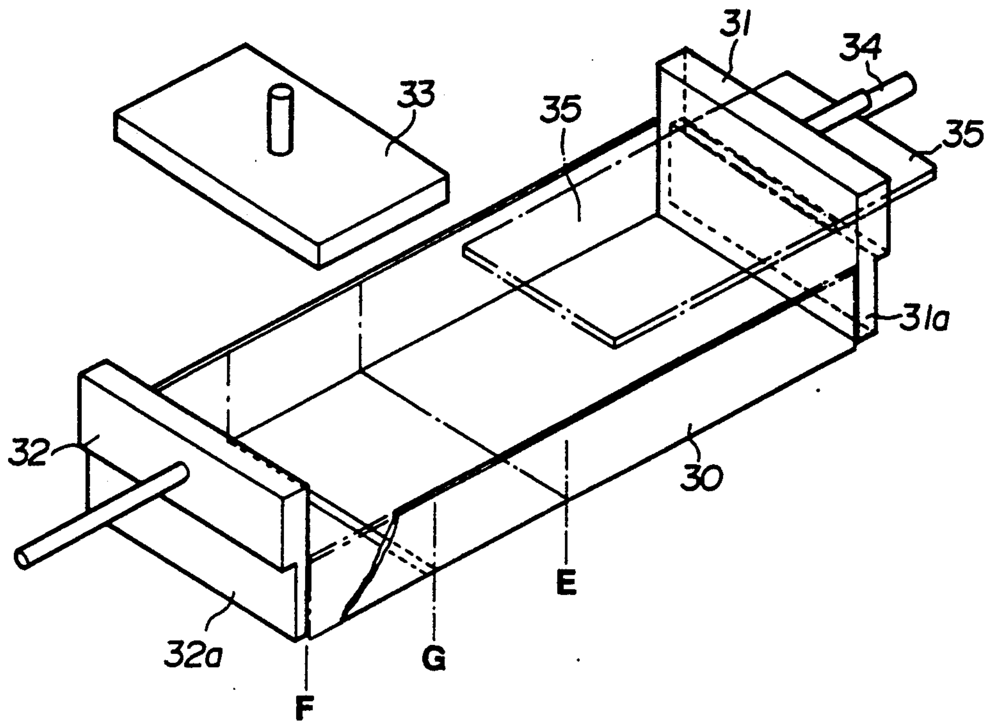
FIG. 6 is a perspective view showing the jig used for compressing polyurethane foam in the second embodiment of the present invention.

FIG. 6 is a perspective view showing the jig used in the second embodiment. There is shown a frame 30 in which the polyurethane foam 5 is fitted. The frame 30 is provided with four pushers. A first pusher 31 and a second pusher 32 are arranged in the lengthwise direction of the frame 30. The pushers 31 and 32 are provided with extended parts 31a and 32a, respectively. It is these extended parts which actually compresses the polyurethane foam. They should preferably be coated with teflon so that their surface has a low coefficient of friction.

At first, the polyurethane foam 5 is placed in the frame 30 in such a manner that the minor axis of the unit cell is perpendicular to the surfaces of the pushers 31 and 32, as in the case of the foregoing embodiment. The pusher 32 is moved to the position G, and then the pusher 31 is moved (against the pusher 32) to the position E, so that the polyurethane foam is compressed between the pushers 31 and 32. With the polyurethane foam compressed, the pushers 31 and 32 are moved to the positions F and G, respectively. The distance between the positions F and G is equal to that between the positions G and E, and the position F is the position where the pusher 32 was originally present.

Figure 7:
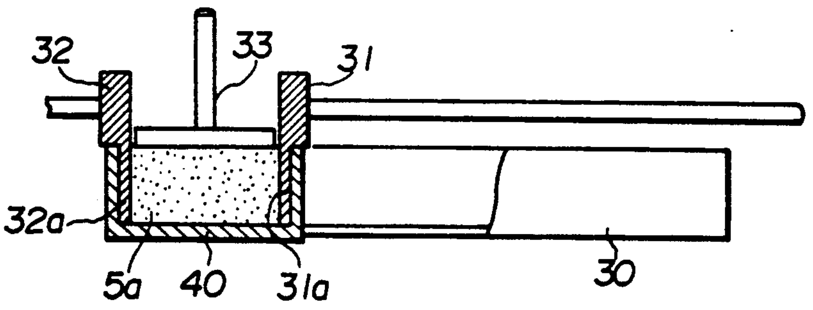
FIG. 7 is a side view showing how the jig shown in FIG. 6 is used in the final step of the second embodiment.

In this state, the container 40 is engaged with the extended parts 31a and 32a. Finally, the third pusher 33 is moved downward to push the compressed polyurethane foam into the container 40 along the extended parts 31a and 32a. FIG. 7 is a sectional side view showing how the compressed polyurethane foam 5a is pushed downward into the container 40 by the third pusher 33.

Incidentally, the fourth pusher 34 has a flat plate 35 which penetrates the extended part 31a. This flat plate 35 is intended to press down the top of the polyurethane foam 5 beforehand. It is actuated before the step of compressing the polyurethane foam 5. It may be necessary depending on the size and properties of the polyurethane foam to be compressed.

What is claimed is:

1. A method for filling a container with a compressed polyurethane foam, comprising the steps of:

(A) compressing a predetermined amount of polyurethane foam comprising unit cells and having an open cell structure, wherein each cell has a minor axis and a major axis, along a plurality of guides and in a first direction oriented along the minor axis of the unit cells of the polyurethane foam so as to form a compressed polyurethane foam;

(B) moving the compressed polyurethane foam resulting from step (A) along a plurality of guide pieces in a second direction oriented perpendicular to the first direction, wherein said second direction is oriented along the major axis of the unit cells; and (C) placing the compressed polyurethane foam resulting from step (B) into the container.

2. The method for filling a container with a compressed polyurethane foam as in claim 1, further comprising the step of compressing the compressed polyurethane foam resulting from step (A) in a third direction perpendicular to both the first direction and the second direction prior to step (B).

3. The method for filing a container with a compressed polyurethane foam as in claim 1, wherein the plurality of guides and plurality of guide pieces are coated with a surface layer of a resin having a low coefficient of friction.

4. The method for filling a container with a compressed polyurethane foam as in claim 3, wherein the resin is a fluoroplastic resin.

5. The method for filling a container with a compressed polyurethane foam as in claim 1, wherein step (A) comprises placing a polyurethane foam block in a frame and pushing a first side of the polyurethane foam block in the first direction against the frame.

6. The method for filling a container with a compressed polyurethane foam as in claim 5, further comprising the step of compressing the compressed polyurethane foam resulting from step (A) in a third direction perpendicular to both the first direction and the second direction.

7. The method for filling a container with a compressed polyurethane foam as in claim 6, wherein the step of compressing the compressed polyurethane foam resulting from step (A) in a third direction comprises pushing a second side of the polyurethane foam block in the third direction against the frame.

* * * * *